United States Patent [19]

Agrawal et al.

[11] Patent Number: 4,559,204

[45] Date of Patent: Dec. 17, 1985

[54] TREATMENT OF PHOSPHATE ORE USED IN PREPARING PHOSPHATE MATRIX SLURRIES

[75] Inventors: Anil K. Agrawal, Somerset; Stephen W. Saunders; George J. Weckesser, both of Plainsboro, all of N.J.

[73] Assignee: Mobil Oil Corporation, New York, N.Y.

[21] Appl. No.: 641,627

[22] Filed: Aug. 17, 1984

[51] Int. Cl.[4] .............................................. C01F 1/00

[52] U.S. Cl. .................................. 423/167; 423/319; 423/320; 423/321 R; 241/17; 241/23

[58] Field of Search .................... 423/167, 319–321 R; 406/197; 241/17, 23

[56] References Cited

U.S. PATENT DOCUMENTS 4,374,817 2/1983 Lehman et al. .................... 423/167

4,389,380 6/1983 Parks .................................. 423/167

OTHER PUBLICATIONS

A. V. Slack ed., *Phosphoric Acid*, Part 1, Marcel Decker, Inc., New York, 1968, p. 171.

*Primary Examiner*—John Doll
*Assistant Examiner*—Jackson Leeds
*Attorney, Agent, or Firm*—Alexander J. McKillop; Michael G. Gilman; Stanislaus Aksman

[57] ABSTRACT

There is disclosed a method of producing water-based phosphate matrix slurries wherein the as-mined phosphate matrix is dried prior to the formation of the slurry. Drying the matrix decreases the viscosity of the slurry and improves the clay consolidation characteristics of the by-product slimes produced during the phosphate slurry beneficiation process steps.

6 Claims, 1 Drawing Figure

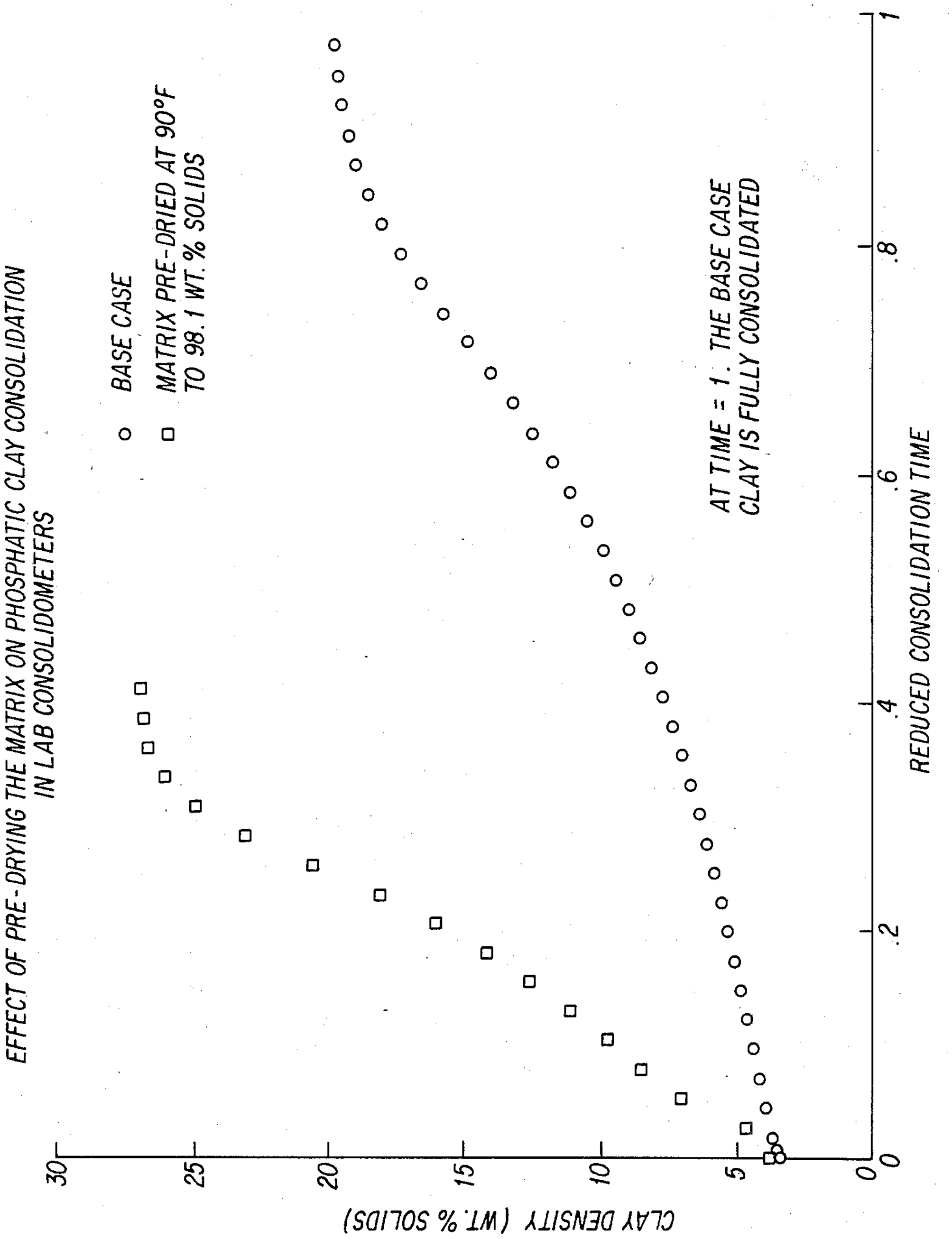
EFFECT OF PRE-DRYING THE MATRIX ON PHOSPHATIC CLAY CONSOLIDATION IN LAB CONSOLIDOMETERS
○ BASE CASE
□ MATRIX PRE-DRIED AT 90°F TO 98.1 WT. % SOLIDS
AT TIME = 1. THE BASE CASE CLAY IS FULLY CONSOLIDATED
CLAY DENSITY (WT. % SOLIDS)
0
5
10
15
20
25
30
REDUCED CONSOLIDATION TIME
0
.2
.4
.6
.8
1

TREATMENT OF PHOSPHATE ORE USED IN PREPARING PHOSPHATE MATRIX SLURRIES

BACKGROUND OF THE INVENTION

1. Field of the Invention

The present invention relates to an improved method of processing of phosphate matrix slurries. More particularly, the present invention relates to a method of reducing the viscosity of phosphate matrix slurries, and improving the consolidation characteristics of phosphatic clays remaining in the water suspension, after the phosphate ore beneficiation process is completed, by drying the phosphate ore utilized to form the slurries.

2. Discussion of the Prior Art

The problems associated with handling of phosphate-containing ores in phosphoric acid manufacturing processes are well recognized. One of the principal problems associated with handling of phosphate matrix (low grade, poor quality clay-bearing phosphate rock) is the viscosity of phosphate matrix slurries. The phosphate matrix is normally slurried in order to facilitate transport of the phosphate-containing ore from a mining site through a pipeline or conduit to a beneficiation facility. In order to promote the efficiency of this transport process, it is highly desirable to maintain as high a slurry concentration as possible without causing extraordinarily high viscosities or excessive pump wear. Accordingly, it is highly desirable to reduce the viscosity of the phosphate matrix slurries so that the energy requirements of the pumping process can be reduced and the productivity of the process can be increased.

Various methods and additives for reducing the viscosity of phosphate matrix slurries have been proposed in the prior art. For example, U.S. Pat. No. 3,035,867 to Corbett teaches the use of additives selected from the group consisting of free coal acids, alkali metal and ammonium salts of free coal acids, and mixtures of these compounds in order to reduce the viscosity of slurries containing phosphate rock. U.S. Pat. No. 4,042,666 to Rice et al teaches the addition of an additive selected from the group consisting of aliphatic hydroxy acids containing 2–6 carbon atoms, water-soluble inorganic salts of the aliphatic hydroxy acids, and blends of the aliphatic hydroxy acids or the aliphatic hydroxy acid salts with a strong base in a process for treating clay-containing phosphate rock slurries in order to reduce the viscosity of these slurries. Additional examples of prior art additives and processes for reducing the viscosity of phosphate matrix slurries by chemical means are disclosed in U.S. Pat. No. 4,177,243 to Schwartz et al; U.S. Pat. No. 4,220,630 to Ore'; U.S. Pat. No. 4,374,817 to Lehman et al; and U.S. Pat. No. 4,402,923 to Lang.

The above-cited prior art references generally teach that viscosity reducing agents may be added at various points during processing of the phosphate matrix. For example, U.S. Pat. No. 4,177,243 to Schwartz et al teaches that the viscosity reducing agents described therein may be added during grinding of the phosphate matrix, or may be added to a slurry of the ground phosphate matrix. U.S. Pat. No. 3,035,867 to Corbett teaches the addition of the viscosity reducing agents by means of either dry mixing the agent with the phosphate matrix or the addition thereof to a slurry containing the ground phosphate matrix. U.S. Pat. No. 4,374,817 to Lehman et al teaches that the viscosity reducing agents described therein can be added at any stage during the preparation of the phosphate matrix slurries, but are preferably added during wet grinding of the phosphate matrix. U.S. Pat. No. 4,042,666 to Rice et al teaches that a chemical treatment to prevent swelling of residual clays and thereby reduce the viscosity of phosphate matrix slurries may be employed at any stage during processing of the phosphate matrix.

Another problem associated with the recovery of phosphate values from the phosphate matrix is the recovery of water used in slurrying the matrix. The matrix, usually mined by surface mining methods, is usually comprised of clay, silica sand and phosphate. Majority of the clay particles are in the size range of less than one (1) micron ($\mu$). After the matrix is mined, it is conventionally combined with water, without any pretreatment of the matrix, to form a slurry, which is subjected to washing, screening, agglomeration and classification before it is transported to the phosphate beneficiation operation, e.g., agglomeration flotation or froth flotation. During the washing operations, extremely finely divided material, originally in the matrix, remains in the aqueous suspension. This aqueous suspension is commonly called "slime" or "phosphatic slime", and it is produced in large quantities during the phosphate ore beneficiation process. The slimes usually amount to about 20–40% of the phosphate ore mined. When it is considered that the slimes are formed as aqueous suspensions containing 1–5% solids, it becomes apparent that enormous quantities of water are used in the phosphate matrix processing.

The disposal of vast amounts of the generated slimes and the recovery of residual phosphate values from slimes presents pressing problems for the phosphate industry.

Slimes present a problem because they retain substantial amounts of their original water, even after years of settling. Not only does this result in an area having no bearing strength, but it also results in the waste of increasingly rare natural resources, water and land. Even after settling for many years, the slimes settle to only about 20% by weight of solids and still are jelly-like in consistency. As a result, there are large areas near the phosphate producing areas of Florida that are virtually useless for any purpose.

The slimes are retained in dammed ponds which must be continuously inspected and repaired. Such dams may fail, thereby polluting the land, rivers and lakes. The pollution damage may be especially severe in the case of polluted waters because of the potentially lethal effects on fish and other life.

The industry has attempted over the years to eliminate the wasteful loss of phosphate values, water and land. For example, U.S. Pat. No. 4,194,969, discloses that the treatment of a phosphate ore matrix with an electrolyte solution containing metal ions, e.g., aluminum, calcium, iron and zinc, and anions, e.g., nitrate, chloride, sulfate and acetate hydroxide, facilitates more rapid slimes sedimentation. Other slimes formation modifying techniques are disclosed in U.S. Pat. Nos. 3,008,575 of Clawson et al, and 3,314,537 of Greene.

Every et al, U.S. Pat. No. 3,359,037 disclose a method of mining of phosphate matrix comprising contacting the matrix deposit with a mineral acid, e.g., sulfuric, phosphoric or nitric acids, to chemically attack the nonphosphatic material cementing the phosphatic particles.

However, none of the previous methods met with the success required in commercial operations.

Accordingly, it is a principal object of the present invention to provide an improved method of processing phosphate matrix slurries.

Additional objects of the present invention are to provide methods of reducing the viscosity of phosphate matrix slurries and improving the consolidation characteristics of slimes obtained as a by-product of the phosphate matrix beneficiation process.

SUMMARY OF THE INVENTION

There is provided a method of producing water-based phosphate matrix slurries comprising drying an as-mined phosphate matrix to obtain a dried matrix having a solids content of at least 90 weight %. The dried matrix is then combined with water in a conventional manner to form the slurry.

BRIEF DESCRIPTION OF THE DRAWING

The FIGURE is a graphical representation of experimental data discussed in Example 2.

DETAILED DESCRIPTION OF THE INVENTION

We discovered that drying the as-mined phosphate matrix, prior to its contact with water used to prepare the slurry, produces a slurry having decreased viscosity as compared to a slurry prepared with the as-mined phosphate matrix. Drying the matrix in the aforementioned manner also improves the consolidation characteristics of the slimes produced during the phosphate matrix beneficiation operations.

The as-mined matrix used in the process of the invention is any conventionally used phosphate matrix obtained, for example, from the phosphate deposits in Florida. Such matrix usually has a solids content of at least about 50 weight %, usually about 50 to about 90 weight %, with the remainder being primarily water.

In conventional phosphate matrix mining operations, overburden is initially removed by mechanical means, e.g., by a drag line, to expose the matrix. The ore matrix is then slurried with water, usually introduced by a high-speed jet. The matrix slurry is transported to the beneficiation plant by a pipeline. In the plant, the slurry is conducted through the screening, washing, sizing and clarification steps.

In the process of the present invention, the ore matrix is dried before it is contacted with water to form a slurry. Accordingly, the conventional phosphate matrix mining operation is modified in the present process by mining or removing the matrix from the formation after the overburden is removed. The matrix is removed by any convenient means, e.g., by any mechanical means. After the matrix is removed from the formation, it is conducted to a drying process step.

The as-mined matrix is dried for a sufficient time at a suitable temperature to obtain a dried matrix having a solids content of at least 90 weight %, preferably 95 to 100 weight %. The as-mined matrix is dried in any conventional manner, e.g., in a continuous or batch dryer or by exposing thin layers thereof to the sun. The drying temperature is not, normally, critical in the process of this invention. A sufficient degree of drying within a reasonable time can be achieved at temperatures of about 90° to about 212° F. The drying step is usually conducted at ambient pressure conditions, although subatmospheric pressures may also be used, if desired. It will be apparent to those skilled in the art that the length of the drying step is not critical so long as a dried matrix having the aforementioned content of solids is obtained.

After the as-mined matrix is dried, the dried matrix is combined with water in a conventional manner to form a slurry. The slurry is then transferred by any suitable means, e.g., a hydraulic pipeline to the conventional downstream phosphate ore beneficiation process steps, such as washing, screening and classification. The slimes produced as a by-product of these beneficiation steps have improved consolidation properties as compared to the slimes produced from a comparable process, wherein the as-mined matrix, without the drying step, is used to produce a slurry. For instance, the data of Example 2, below, indicates that the consolidation rate can be tripled under certain conditions.

In order to more fully illustrate the nature of the invention and the manner of practicing same, the following examples are presented.

EXAMPLE 1

(Viscosity Reduction)

The viscosity-reducing effect of the process of this invention was tested on a typical phosphate matrix sample from the Fort Meade, Fla. area. The sample contained 69.6 weight % solids. The sample was dried in a conventional laboratory oven at 90° F. to 98.3 weight % solids.

The matrix was then mixed with water to obtain a slurry containing 40 weight % solids. The resulting slurry was subjected to high shear conditions (20 minutes agitation with a twin-blade mixer) to simulate field operations.

The rheology of a portion of this slurry was then studied and compared to a base case slurry that was formed from matrix that was not dried. Viscosity measurements were taken using a Model RV Brookfield Viscometer (#3 spindle). The apparent viscosity was observed at five different revolutions per minute, 1, 5, 10, 50 and 100, thereby allowing the calculation of the Bingham yield point and the plastic viscosity.

As is known to those skilled in the art, Bingham yield point is the y-intercept of the line fitting the data in a shear-shearing stress diagram. As is also known to those skilled in the art, plastic viscosity is the slope of this line. These parameters define the rheology of a non-Newtonian fluid, such as phosphatic clay slurries. The measurement and significance of these parameters is discussed in greater detail in a thesis of Rajen Chanchani, entitled "THE EFFECT OF DEFLOCCULANTS ON THE RHEOLOGICAL BEHAVIOR OF CONCENTRATED PHOSPHATE SLIME", published at the University of Florida, Gainesville, Fla. 1976, the entire contents of which are incorporated herein by reference.

After the appropriate dilutions, viscosity measurements were repeated at 30 weight % and at 20 weight % solids.

As Table 1, below, shows, pre-drying the matrix reduced the Bingham yield point by 60% in the phosphate matrix slurry containing 40 weight % solids, by 68% in the slurry containing 30 weight % solids, and by 67% in the slurry containing 20 weight % solids.

TABLE 1

The Effect of Pre-Drying the Matrix on Matrix Slurry Rheology

| | Matrix Not Dried | | Matrix Dried | |
|---|---|---|---|---|
| Wt % Solids in the Matrix Slurry | Bingham Yield Point -dynes/cm$^2$ | Plastic Viscosity -cp | Bingham Yield Point -dynes/cm$^2$ | Plastic Viscosity -cp |
| 40 | 6.72 | 231 | 2.70 | 66 |
| 30 | 2.64 | 64 | 0.84 | 37 |
| 20 | 0.72 | 46 | 0.24 | 23 |

EXAMPLE 2

(Clay Consolidation Acceleration)

The clay consolidation-enhancing effect of the process of this invention was tested on a typical phosphate matrix sample from the Fort Meade, Fla., area. The sample contained 69 weight % solids. The sample was dried in a conventional, laboratory oven at 90° F. to 98.1 weight % solids.

The matrix was then mixed with water to obtain a slurry containing 40 weight % solids. The slurry was subjected to high shear conditions (20 minutes agitation with a twin-blade mixer) to simulate field operations.

Phosphatic clay waste (slime) was generated by screening the slurry through a 150 mesh screen, collecting the underflow and diluting it to 3.5 weight % solids.

The resulting clay slurry was then consolidated in a laboratory consolidometer which simulates clay consolidation of commercial size ponds under laboratory conditions under an effective stress of 0.21±0.02 psi.

The consolidation characteristics of this clay slurry were compared to those of a base case slurry, prepared from the same matrix, except that the matrix was not pre-dried. The consolidation curves of the two clay slurries are shown in the FIGURE.

The data of the FIGURE indicates that drying of the phosphate matrix before the formation of the slurry increased the clay consolidation rate by 210% and increased the final clay density by 7.1 weight %.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A method of producing a water-based phosphate matrix slurry, comprising:

drying an as-mined phosphate matrix to obtain a dried matrix having a solids content of at least 90 weight % and combining the dried phosphate matrix with water to form a slurry having decreased viscosity as compared to a slurry prepared with the as-mined phosphate matrix.

2. A method of claim 1 wherein the dried matrix has a solids content of 95 weight % to 100 weight %.

3. A method of claim 2 wherein the as-mined phosphate matrix is dried at a temperature of about 90° F. to about 212° F. at ambient pressure.

4. A method of claim 3 wherein the as-mined phosphate matrix has a solids content of at least 50 weight %.

5. A method of claim 4 wherein the phosphate matrix slurry contains about 20 to about 40 weight % solids.

6. A method of claim 5 wherein the dried matrix has a solids content of about 98 weight %.

* * * * *